July 12, 1938. J. S. NACHTMAN Re. 20,788
METHOD OF PLATING STEEL
Original Filed Feb. 4, 1930
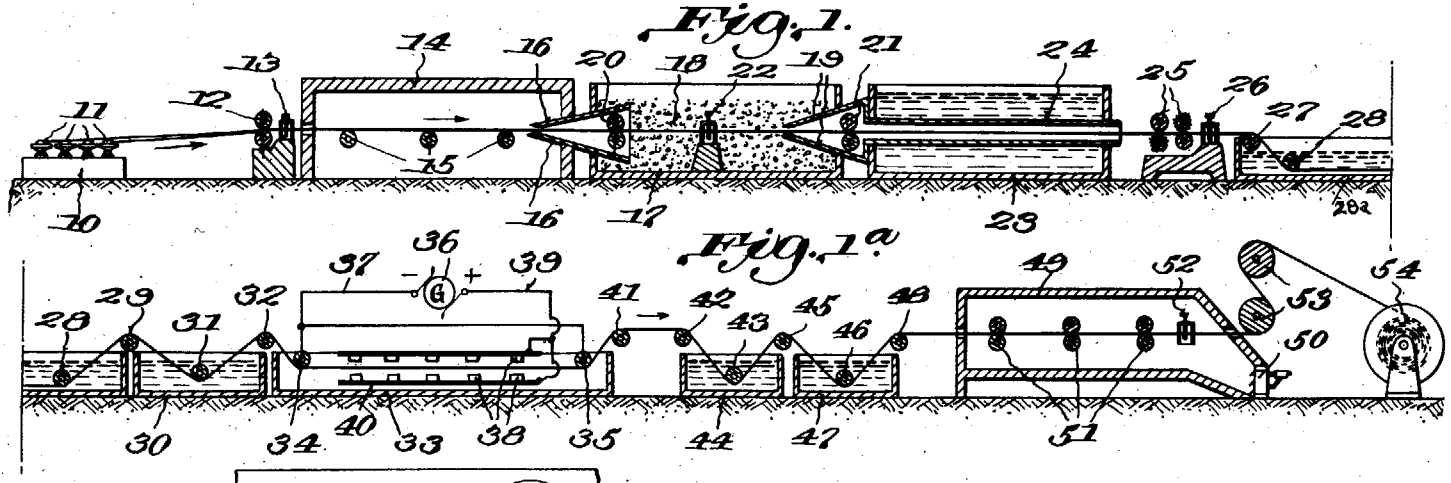
Fig. 1.
Fig. 1a.
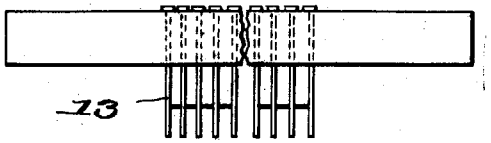
Fig. 3.
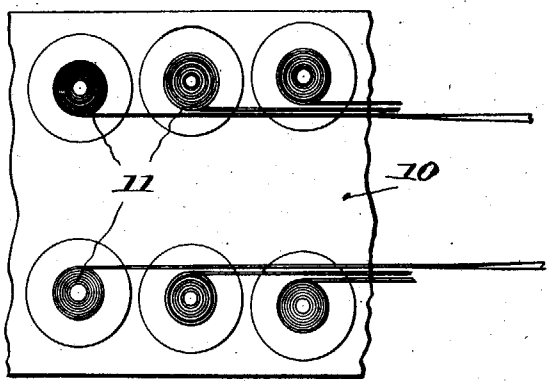
Fig. 2.
Inventor
John S. Nachtman
By Chas. J. Williamson
Attorney Reissued July 12, 1938 Re. 20,788

UNITED STATES PATENT OFFICE 20,788

METHOD OF PLATING STEEL

John S. Nachtman, Beaver, Pa., assignor to Blaw-Knox Company, Pittsburgh, Pa., a corporation of New Jersey Original No. 1,991,817, dated February 19, 1935, Serial No. 425,881, February 4, 1930. Application for reissue February 18, 1937, Serial No. 126,529

1 Claim. (Cl. 204—17)

The object of my invention, stated in a general way, and speaking in reference to the particular metal with which I am especially concerned, is to plate steel with a film or plating of other metal,—tin for example, so as to secure an excellent product, and to secure that product at the minimum of cost. According to the practice in vogue known to me, tin plating of steel is done by a thermo-mechanical method, and it fails to give a product of the excellence of that produced by my invention, and it is not as inexpensive to produce as in my case. Briefly described, my invention utilizes electro-plating, the steel plated being in thin plates, or narrow strips or ribbons, and it is run in continuous strips or ribbons through the apparatus,—each strip or ribbon steel being taken from a coil or reel, and when coated being wound in a coil.

My invention consists in whatever is described by or is included within the terms or scope of the appended claim.

In the drawing:—

Fig. 1 is a vertical longitudinal section of apparatus that in its construction and mode of operation embodies my invention, the figure being made in two parts, one below the other to enable larger scale drawing;

Fig. 2 is a top plan view of a portion of the strip supply end of the apparatus;

Fig. 3 is a detail view in cross section on line 3—3 of Fig. 1.

As the same treating apparatus can be employed with a large number of strips or ribbons of steel at the same time, I place upon a platform, 10, a number of spools or reels, 11, in two rows side by side, upon vertical axes, each spool holding a coil of steel ribbon. From these reels, the steel passes to and between a pair of horizontal rolls, 12, the flat steel ribbons being turned between the reels and the rolls through 90° so that while they pass edgewise from the reels they enter between and pass from the rolls flatwise. The strips or ribbons of steel are placed as closely together as possible side by side between the rolls, 12, in order to enable treatment of as many steel strips as possible with the one treating apparatus. From the draw rolls, 12, the strips pass to a guide device which as shown in Fig. 3 may consist of vertical round rods, 13, between adjacent ones of which a strip of steel passes and is thus guided in its onward movement and thus twisting, swinging or coiling of the strip is prevented.

From the guide device the strips pass horizontally into and through a furnace, 14, capable of maintaining a temperature as high as 2100° F. and which may be any ordinary gas or coal burning furnace. The purpose of the furnace treatment is to anneal and temper the steel in preparation for or to place it in condition for subsequent electro-tin-plating by the apparatus. The steel strips are supported while passing through the furnace by horizontal rollers, 15, mounted preferably in roller bearings located outside the furnace.

The steel strips make their exit from the furnace 14 through an outlet gate that consists of upwardly and downwardly diverging plates, 16, of high temperature resisting steel, the outlet end of such gate being located in a tank, 17, so that a passage closed to external atmosphere is provided from the furnace to said tank 17, to prevent chilling or cooling of the steel on its way to said tank, 17. In the tank or box, 17, is a bed of charcoal, 18, which extends sufficiently above the steel strips to completely cover them, so that, above and below, the steel strips are covered with charcoal. This arrangement is provided to cause the steel heated by the furnace to be slowly cooled. The strip outlet from the tank or box, 17, consists of a pair of upwardly and downwardly diverging plates, 19, which like the plates, 16, at the inlet end protect the steel from sudden cooling by external air. At the inlet end of the box or tank, 17, is a pair of rolls, 20, and at the outlet end there is a pair of rolls, 21, similar to the rolls, 12, and about midway of the length of the tank or box is a strip guide, 22, similar to the one composed of the vertical rods, 13.

The ends of the protecting plates, 19, that are closer together are sufficiently close to the strips of steel passing into the space between them as to prevent charcoal in contact with the strips being carried onward.

From the rollers, 21, the partially cooled strips pass into and through a muffler for further cooling the strips. This muffler or cooling device comprises a tank, 23, for the circulation of cold water, through which pass parallel upper and lower plates, 24, that are continuations of the outer ends of the plates, 19, and are spaced sufficiently apart to provide an air chamber through which the steel strips pass and by which they are kept from contact with the cool water.

The slow, gradual cooling of the strips coming from the furnace, 14, which is accomplished by their passage through the charcoal and water tanks results in oxidation to a slight extent only and to remove whatever oxidation may have formed the steel strips are passed from the muffler or water-cooling device to and between sets of revolving wire brushes, 25, which by a suitable motor, which may be an electric motor, are driven at high speed with their bristles or wires in contact with all surfaces of the steel strips as they pass between them.

From the cleaning brushes, 25, the thus mechanically cleaned strips pass to a guide, 26, similar to the guides 13 and 22 and from said guide, 26, they pass to and over a guide roller, 27 and into a tank, 28a, which contains a weak solution of hydrochloric acid, the strips from the guide roller, 27 being carried over a pair of acid resisting rollers, 28, situated near the bottom of the tank and near each end thereof and from the second roller, 28, the strips pass upward to a guide roller, 29, by which they are led or directed out from the acid tank. The treatment in the acid tank is to remove by chemical action any oxidation on the strips not removed by the mechanical action of the cleaning brushes. From the acid tank, 28a, the strips are directed down into and caused to pass through water in a tank, 30, for the purpose of rinsing or removing from the steel any acid that may be taken up in the acid tank. To direct the steel strips into the water rinsing tank 30, a guide roller, 31, is provided below the top of the tank, 30, to which the strips pass from the roller, 29, and from the roller, 31, the strips pass upward to a guide roller, 32, by which they are led out of the rinsing tank.

By the treatment thus far described, which begins with heating and ends with placing the strips in a condition with chemically cleaned surfaces, the strips are now ready for the electro-plating process by which all surfaces of the strips are tin plated.

The plating apparatus comprises a tank, 33, for a suitable electrolyte such as sodium stannate, sodium hydroxide, sodium acetate, etc. The strips pass from the roller, 32, to a copper roller, 34, by which they are directed down into the tank, 33, and submerged in the electrolyte and at the far end of the tank, 33, they pass under a copper roller, 35, and thence out of the tank, 33. The copper rollers, 34 and 35, are connected with the negative pole of a source of supply, 36, of electricity by a conductor, 37, and immersed in the electrolyte within the tank, 33, in the space between the copper rollers, 34 and 35, are bars, 38, of tin which being connected by a conductor, 39, with the positive pole of the source of current constitute the anodes. The tin bars 38, may rest upon a rack consisting of copper bars, 40, with which the conductor, 39, is connected.

Thus by electro-deposition tin is applied to and made to adhere to all of the surfaces of the steel bars in an evenly distributed amount and in whatever thickness of film or plating may be desired. The degree of plating or coating can be made to depend upon the speed with which the strips are passed through the electrolyte so that by varying such speed the thickness of the coating may be changed. Imperfections in the tin coating which unavoidably result from the thermo-mechanical method due to the necessity to use a flux, and pitting or a porous condition which results from the pressure rolls that are used in the thermo-mechanical method, are wholly avoided and not only is there greater perfection in the plating, but it can be made thinner and yet assure complete insulation or covering of the steel.

From the second copper roller, 35, of the electro-deposition tank the now plated strips pass to a guide roller, 41, by which they are led out of the tank, 33, and from which they pass to and over a guide roller, 42, down to and under a guide roller, 43, in a cool water holding tank, 44 for rinsing from the strips any electrolyte adhering to them and from the cold water tank, 44, they pass over a guide roller, 45, to a warm water holding tank, 47, preliminary to passing to and through a drying apparatus, the warm water tank being used for the second bath because it results in drying of the steel strips more readily. From the warm bath tank, the strips pass to and over a guide roller, 48, and thence horizontally into a drier, 49, which comprises a chamber through which hot dry air is circulated by some suitable hot air circulating device, 50, at the far end of said drier. It is not necessary to show and describe the construction of said hot air circulating device, as it forms no part of my invention. Within the drying chamber are several sets of buffing rolls, 51, arranged in pairs one above the other between which the strips pass and by which the plated steel surfaces engaged thereby are polished. The rolls, 51, are driven at a high speed. From the last set of rolls, 51, the strips pass through a guide device, 52, made of vertical rods similar to those of the other guides such as 13, and leaving the device, 52, the now plated dried and polished strips pass in succession over two rolls, 53, placed one above the other and driven by a variable high speed electric motor and by which the power is applied to the strips for drawing them from the reels at the commencement of the operation through the various devices which constitute the apparatus shown. Continuity of strips and thus continuity of the plating operation are secured by joining end to end successive strips as they come from the supply coils, as by spot welding. From the rolls, the plated and polished strips pass side by side but still without edge contact, and each strip is passed to a spindle or coil block, 54, that is revolved to form the strip into a coil for convenient subsequent handling when taken from the machine and the coiling block is revolved at a speed slightly faster than the speed of the rolls, 53. The guide devices between which at intervals the strips pass from the time of entering the heating furnace until they emerge from the drier not only prevent twisting, coiling and snarling of the strips which might occur from the fact that they are taken from coils, but it assures that when they pass through the electroplating tank, they will be kept out of contact, so that their side edges will be completely exposed for plating.

As far as my method is concerned, I, of course, do not confine myself to any particular apparatus for practicing my method and as to the apparatus which forms the subject of the claim, it is to be understood that changes in construction and relative arrangement of devices or members of that apparatus may be made without departure from my invention.

I claim:

In a process for producing tin plated steel strip, heating the strip to a temperature sufficiently high to anneal and temper the same, gradually cooling said strip while preventing contact with external air, joining portions of strip end to end to form continuous strip with good electrical contact at the joint, and moving the continuous strip uninterruptedly and at a substantially constant speed through the sequential operations of acid pickling, washing, electroplating in a tin bath in which the moving strip constitutes the cathode and passes between anodes distributed along the submerged portion of the strip, washing, and drying, said operations thus producing steel strip coated with an adherent and evenly distributed electrodeposit of tin.

JOHN S. NACHTMAN.